(12) United States Patent
Takami et al.

(10) Patent No.: US 11,794,900 B2
(45) Date of Patent: Oct. 24, 2023

(54) INFORMATION PROCESSING APPARATUS

(71) Applicant: NTT DOCOMO, INC., Tokyo (JP)

(72) Inventors: Tadao Takami, Tokyo (JP); Koji Ishii, Tokyo (JP); Jooin Woo, Tokyo (JP); Hiroshi Kawakami, Tokyo (JP); Kaori Niihata, Tokyo (JP); Yuichiro Segawa, Tokyo (JP); Yasuhiro Kitamura, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 261 days.

(21) Appl. No.: 17/283,386

(22) PCT Filed: Oct. 28, 2019

(86) PCT No.: PCT/JP2019/042195
§ 371 (c)(1),
(2) Date: Apr. 7, 2021

(87) PCT Pub. No.: WO2020/121666
PCT Pub. Date: Jun. 18, 2020

(65) Prior Publication Data
US 2021/0380240 A1    Dec. 9, 2021

(30) Foreign Application Priority Data

Dec. 14, 2018 (JP) .................. 2018-234333

(51) Int. Cl.
*B64D 1/02* (2006.01)
*B64C 39/02* (2023.01)
(Continued)

(52) U.S. Cl.
CPC .............. *B64D 1/02* (2013.01); *B64C 39/024* (2013.01); *B64D 47/08* (2013.01); *G05D 1/0011* (2013.01);
(Continued)

(58) Field of Classification Search
CPC ...... B64D 1/02; G05D 1/0011; G05D 1/0088; B64C 39/024
(Continued)

(56) References Cited

U.S. PATENT DOCUMENTS 10,401,874 B1 * 9/2019 Acknin .................... B64D 1/22
2018/0072419 A1 * 3/2018 Burgess ................. G05D 1/042
(Continued)

FOREIGN PATENT DOCUMENTS

JP    2010269724 A    12/2010

OTHER PUBLICATIONS

International Search Report issued in corresponding PCT Application No. PCT/JP2019/042195 dated Dec. 24, 2019.

*Primary Examiner* — Peter D Nolan
*Assistant Examiner* — Luke Huynh
(74) *Attorney, Agent, or Firm* — DILWORTH IP, LLC

(57) ABSTRACT

Baggage is connected to an aerial vehicle in a state in which the baggage is suspended by a connector such as rope. A learning unit of a server device performs machine learning on the relationship between the piloting of an aerial vehicle and the behavior of baggage on the basis of an aerial vehicle behavior history and a piloting history acquired by a first acquisition unit and a baggage behavior history acquired by a second acquisition unit. With this arrangement, the automatic piloting of the aerial vehicle at the time of lowering baggage is achieved.

6 Claims, 3 Drawing Sheets

(51) Int. Cl.
*B64D 47/08* (2006.01)
*G05D 1/00* (2006.01)
*B64U 101/60* (2023.01)

(52) U.S. Cl.
CPC ....... *G05D 1/0088* (2013.01); *B64U 2101/60* (2023.01); *B64U 2201/10* (2023.01); *B64U 2201/20* (2023.01)

(58) Field of Classification Search
USPC .......................................................... 701/3
See application file for complete search history.

(56) References Cited

U.S. PATENT DOCUMENTS

2018/0237276 A1* 8/2018 Bialkowski ............ B66D 1/485
2020/0062399 A1* 2/2020 Prager ..................... B64D 1/10

* cited by examiner

INFORMATION PROCESSING APPARATUS

TECHNICAL FIELD

The present invention relates to a technique for learning the piloting of an aerial vehicle.

BACKGROUND

Unmanned aerial vehicles called drones are becoming increasingly popular. For example, Japanese Patent Application Laid-Open No. 2010-269724 discloses a technique for achieving accurate landing of an unmanned aerial vehicle.

SUMMARY OF INVENTION

A baggage delivery service has been considered in which such a type of an aerial vehicle flies, from which baggage is suspended with a connector such as a rope, and the baggage is lowered onto the ground when the aerial vehicle reaches a destination. In this type of service, in order to enable fragile baggage to be also handled, it is desirable to pilot the aerial vehicle well enough that the baggage is lowered onto the ground in a stable state with minimum possible shaking. Further, it would be convenient if automatic piloting of an aerial vehicle could be achieved by learning the piloting technique of a skilled operator who is proficient at such piloting.

Accordingly, an objective of the present invention is to learn piloting for lowering, in a stable state, an object connected to an aerial vehicle.

To this end, the present invention provides an information processing apparatus including: a first acquisition unit that acquires a piloting history of an aerial vehicle in a case where an object connected to the aerial vehicle piloted by an operator is lowered to a target point; a second acquisition unit that acquires a behavior history of the object in the case where the object is lowered to a target point; and a learning unit that learns a relationship between piloting of the aerial vehicle and a behavior of the object on the basis of the piloting history acquired by the first acquisition unit and the behavior history of the object acquired by the second acquisition unit.

The learning unit may perform the learning on the basis of a behavior history of the aerial vehicle in addition to the piloting history and the behavior history of the object.

The learning unit may perform the learning on the basis of at least one of a condition related to a connector used to connect the aerial vehicle and the object, a condition related to the object, or a condition related to an external environment at the time of lowering the object, in addition to the piloting history and the behavior history of the object.

The condition may include at least one of the stiffness of the connector, the length of the connector, the weight of the object, the volume of the object, the lowering speed of the object, or the wind direction, the air volume, rainfall, or snowfall at the time of lowering the object.

The second acquisition unit may acquire the behavior history of the object from an image of the object captured by an imaging device.

The second acquisition unit may acquire the behavior history of the object from an output value of a sensor installed to the object or to a housing unit of the object.

The present invention makes it possible to learn piloting for lowering, in a stable state, an object connected to an aerial vehicle.

DETAILED DESCRIPTION

Configuration

Figure 1:
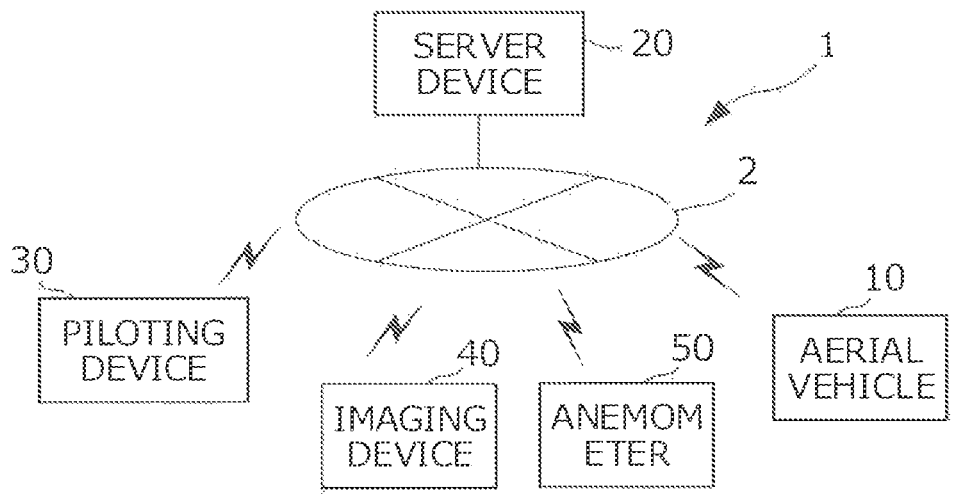
FIG. 1 is a diagram illustrating an example of the configuration of a flight system in accordance with the present invention.

FIG. 1 is a diagram illustrating an example of the configuration of a flight system 1. The flight system 1 includes an unmanned aerial vehicle 10 called, for example, a drone, a server device 20 which functions as an example of an information processing unit in accordance with the present invention, a piloting device 30 which functions as a remote controller for an operator to pilot the aerial vehicle 10, an imaging device 40 which images an object (hereinafter referred to as the baggage) connected to the aerial vehicle 10, an anemometer 50 which measures a wind direction and/or a wind speed, and a network 2 connecting these to make them communicable. The network 2 includes a radio communication network, such as LTE (Long Term Evolution), and is provided with a radio base station or a higher-level device thereof, neither of which is illustrated.

The aerial vehicle 10 receives, through the network 2, a signal corresponding to a piloting operation performed by the operator using the piloting device 30, and controls its own flight according to the signal. In the present embodiment, an example will be described in which the aerial vehicle 10 is piloted using radio signals received from the piloting device 30 through the network 2; however, the present invention is not limited thereto. Alternatively, the aerial vehicle 10 may be piloted using radio signals that directly reach the aerial vehicle 10 from the piloting device 30 without passing through the network 2.

Baggage is connected to the aerial vehicle 10 in a state in which the baggage is suspended by a connector, such as a rope, a chain, a wire, or a net. The aerial vehicle 10 flies with the baggage suspended, and when reaching the destination, the aerial vehicle 10 feeds out downward the connector, which connects the baggage, while maintaining a predetermined altitude, and lowers the baggage. Here, in order to make it possible to also handle fragile baggage and the like, it is desired to pilot the aerial vehicle 10 such that the baggage is lowered to a desired point (e.g. on the ground, at a predetermined place of a building (rooftop or the like), on a ship or the like) while keeping the baggage in as stable a state as possible. In the present embodiment, by learning the piloting technique of an operator capable of performing such piloting, the automatic piloting of the aerial vehicle 10 at the time of lowering the baggage will be achieved.

The server device 20 learns the relationship between the piloting of the aerial vehicle 10 and the behavior of baggage on the basis of the behavior history of the aerial vehicle 10 and the piloting history of the aerial vehicle 10 when an object connected to the aerial vehicle 10 is lowered to a target arrival point of the baggage, such as on the ground, the behavior history of the baggage when the baggage is lowered onto the ground, and the wind direction or the wind speed measured by the anemometer 50. By a learning model generated on the basis of the result of learning the foregoing relationship, the automatic piloting that enables the behavior of baggage to be kept within a certain range, and the automatic piloting that enables the behavior of the baggage to be kept within the certain range without delay even if the behavior of the baggage deviates from the certain range. In the following description, it will be assumed that the target arrival point of the baggage is on the ground.

Figure 2:
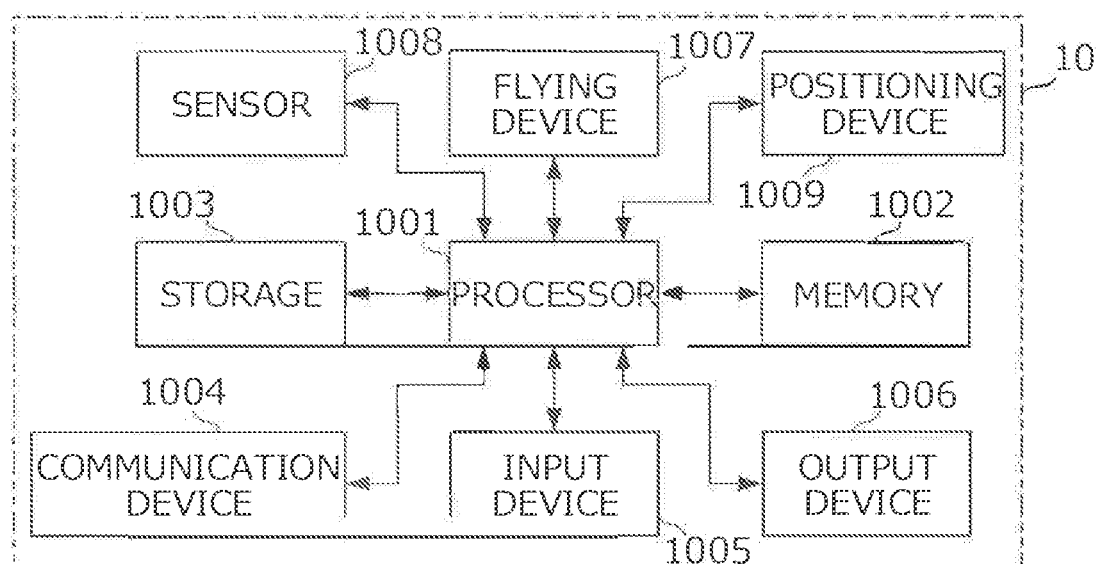
FIG. 2 is a diagram illustrating the hardware configuration of an aerial vehicle in accordance with the present invention.

FIG. 2 is a diagram illustrating the hardware configuration of the aerial vehicle 10. The aerial vehicle 10 is physically configured as a computer system that includes a processor 1001, a memory 1002, a storage 1003, a communication device 1004, an input device 1005, an output device 1006, a flying device 1007, a sensor 1008, a positioning device 1009, and a bus that connects these constituent elements. Each of these apparatuses operates with electric power supplied from a battery (not shown). In the following description, the term "apparatus" can be read as a circuit, a device, a unit, or the like. The hardware configuration of the aerial vehicle 10 may be formed to include one device or a plurality of devices illustrated in the drawing, or may be configured without including some devices.

The functions of the aerial vehicle 10 are performed by reading predetermined software (program) on hardware such as the processor 1001 and the memory 1002, so that the processor 1001 performs an operation, the communication is controlled by the communication device 1004, and at least one of reading and writing of data in the memory 1002 and the storage 1003 is controlled.

The processor 1001 controls, for example, the entire computer by operating an operating system. The processor 1001 may be composed of a central processing unit (CPU) that includes an interface with peripheral devices, a control unit, an arithmetic unit, a register, and the like. Further, for example, a baseband signal processing unit, a call processing unit, and the like may be implemented by the processor 1001.

The processor 1001 reads out a program (program code), a software module, data, and the like from at least one of the storage 1003 and the communication device 1004 to the memory 1002, and executes various types of processing according to these. As the program, a program that causes a computer to execute at least a part of the operations described below is used. The functional blocks of the aerial vehicle 10 may be implemented by a control program stored in the memory 1002 and run by the processor 1001. Various types of processing may be executed by one processor 1001, or may be executed simultaneously or sequentially by two or more processors 1001. The processor 1001 may be implemented by one or more chips. The program may be transmitted from the network 2 to the aerial vehicle 10 through a telecommunication line.

The memory 1002 is a computer-readable recording medium, and may be composed of at least one of, for example, a ROM (Read Only Memory), an EPROM (Erasable Programmable ROM), an EEPROM (Electrically Erasable Programmable ROM), and a RAM (Random Access Memory). The memory 1002 may be called a register, a cache, a main memory (main storage device), or the like. The memory 1002 can store a program (program code), a software module, and the like that can be executed to perform a method according to the present embodiment.

The storage 1003 is a computer-readable recording medium, and may be composed of at least one of, for example, an optical disk, such as a CD-ROM (Compact Disc ROM), a hard disk drive, a flexible disk, and a magneto-optical disk (e.g. a compact disk, a digital versatile disk, a Blu-ray (registered trademark) disk), a smart card, a flash memory (e.g. a card, a stick, a key drive), a floppy (registered trademark) disk, a magnetic strip, or the like. The storage 1003 may be called an auxiliary storage device. The storage 1003 stores, for example, the identification information of the aerial vehicle 10 (referred to as aerial vehicle identification information).

The communication device 1004 is hardware (a transmission/reception device) for performing communication between computers through at least one of a wired network and a wireless network, and is also referred to as, for example, a network device, a network controller, a network card, a communication module, or the like.

The input device 1005 is an input device that receives inputs from outside (e.g. a keyboard, a mouse, a microphone, a switch, a button, a sensor, a joystick, a ball controller, and the like). The output device 1006 is an output device that performs output to outside (e.g. a display, a speaker, an LED lamp, and the like). The input device 1005 and the output device 1006 may have an integrated configuration (e.g. a touch panel).

The flying device 1007 is a mechanism for flying the aerial vehicle 10 in the air, and includes, for example, a propeller, and a motor and a drive mechanism for driving the propeller.

The sensor 1008 detects the condition of the aerial vehicle 10. The sensor 1008 includes a sensor group of, for example, a temperature sensor, a rotation speed sensor that detects the rotation speed of a motor, a sensor that detects a value related to certain input/output such as current/voltage (e.g. a remaining power sensor of a battery), a gyro sensor, an acceleration sensor, an atmospheric pressure (altitude) sensor, a magnetic (azimuth) sensor, and an ultrasonic sensor.

The positioning device 1009 measures the three-dimensional position of the aerial vehicle 10. The positioning device 1009 is, for example, a GPS (Global Positioning System) receiver, and measures the position of the aerial vehicle 10 on the basis of the GPS signals received from a plurality of satellites.

In the present embodiment, the behavior of the aerial vehicle 10 is identified by the sensor 1008 and the positioning device 1009 described above.

The devices, such as the processor 1001 and the memory 1002, are connected by a bus for communicating information. The bus may be configured using a single bus, or may be configured using a different bus for each device.

The aerial vehicle 10 may be configured by including hardware such as a microprocessor, a digital signal processor (DSP), an ASIC (Application Specific Integrated Circuit), a PLD (Programmable Logic Device), and an FPGA (Field Programmable Gate Array). Alternatively, some or all of the functional blocks may be implemented by the hardware. For example, the processor 1001 may be implemented using at least one of these pieces of hardware.

Figure 3:
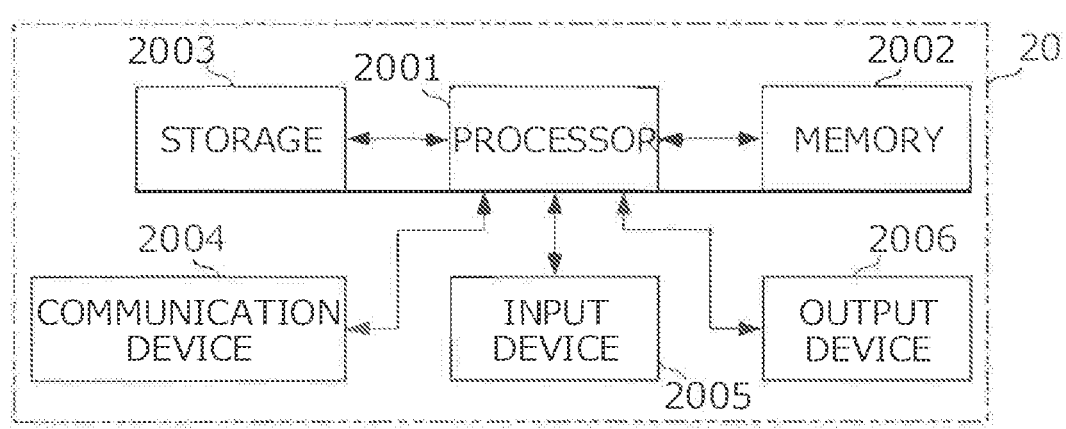
FIG. 3 is a diagram illustrating the hardware configuration of a server device in accordance with the present invention.

FIG. 3 is a diagram illustrating the hardware configuration of the server device 20. The server device 20 is physically configured as a computer device that mainly includes the processor 2001, the memory 2002, the storage 2003, the communication device 2004, the input device 2005, the output device 2006, and a bus connecting these constituent elements. The functions of the server device 20 are performed by reading predetermined software (program) onto hardware such as the processor 2001 and the memory 2002, so that the processor 2001 carries out calculation, communication is controlled by the communication device 2004, and at least one of the reading and writing of data in the memory 2002 and the storage 2003 is controlled. The processor 2001, the memory 2002, the storage 2003, the communication device 2004, the input device 2005, the output device 2006, and the bus connecting these are the same, as hardware, as the processor 1001, the memory 1002, the storage 1003, the communication device 1004, the input device 1005, the output device 1006, and the bus connecting these described in relation to the aerial vehicle 10, and therefore, the descriptions thereof will be omitted.

Figure 4:
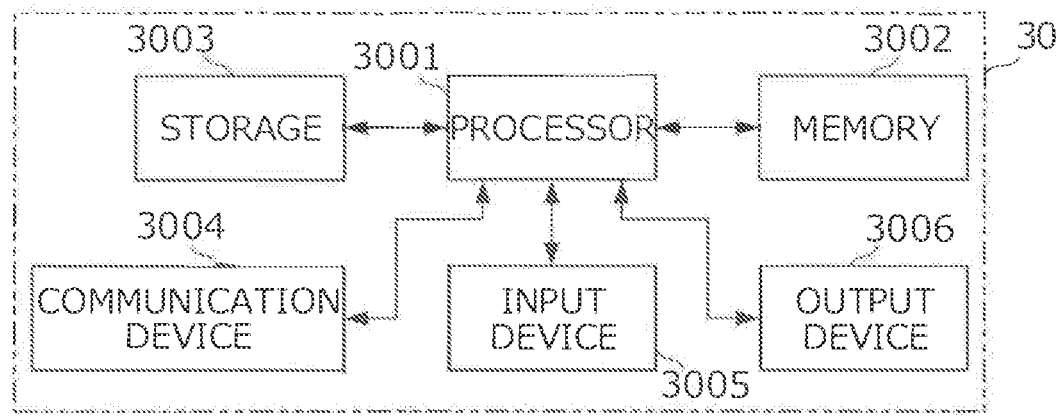
FIG. 4 is a diagram illustrating the hardware configuration of a piloting device in accordance with the present invention.

FIG. 4 is a diagram illustrating the hardware configuration of the piloting device 30. The piloting device 30 is physically configured as a computer device that mainly includes a processor 3001, a memory 3002, a storage 3003, a communication device 3004, an input device 3005, an output device 3006, and a bus connecting these. The functions in the piloting device 30 are performed by reading predetermined software (program) onto hardware such as the processor 3001 and the memory 3002, so that the processor 3001 carries out calculation, communication is controlled by the communication device 3004, and at least one of the reading and writing of data in the memory 3002 and the storage 3003 is controlled. The processor 3001, the memory 3002, the storage 3003, the communication device 3004, the input device 3005, the output device 3006, and the bus connecting these are similar, as hardware, to the processor 1001, the memory 1002, the storage 1003, the communication device 1004, the input device 1005, the output device 1006, and the bus connecting these described in relation to the aerial vehicle 10, and therefore, the descriptions thereof will be omitted.

Figure 5:
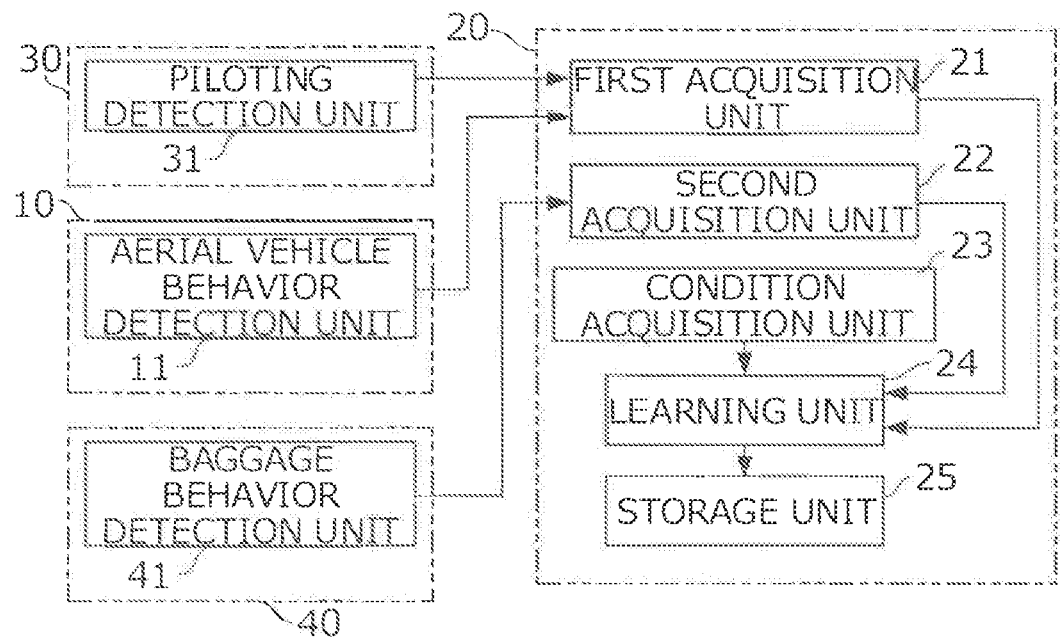
FIG. 5 is a diagram illustrating an example of the functional configuration of the flight system in accordance with the present invention.

FIG. 5 is a diagram illustrating an example of the functional configuration of the flight system 1. In the piloting device 30, a piloting detection unit 31 detects the content input to the input device 3005 by an operator, i.e. the content of the piloting, generates information indicating the result of the detection (referred to as the piloting history), and transmits the generated information to the server device 20 through the network 2. The piloting history includes a time stamp indicating the date and time when piloting was performed and the aerial vehicle identification information of the aerial vehicle 10 to be piloted, as well as piloting contents such as the type, amount, and direction of the piloting. The aerial vehicle identification information of the aerial vehicle 10 to be piloted is, for example, input to the piloting device 30 by the operator or the like before the piloting of the aerial vehicle 10 is started.

In the aerial vehicle 10, an aerial vehicle behavior detection unit 11 detects the behavior of the aerial vehicle 10, generates information indicating the result of the detection (referred to as the aerial vehicle behavior history), and transmits the generated information to the server device 20 through the network 2. The aerial vehicle behavior history includes a time stamp indicating the date and time when the behavior was performed and the aerial vehicle identification information stored in the storage 1003 of the aerial vehicle 10, as well as the information indicating the behavior of the aerial vehicle 10 that can be identified by the sensor 1008 and the positioning device 1009, such as the position (including the latitude, the longitude, and the altitude), the flight direction, the flight speed, and the flight acceleration of the aerial vehicle 10. The time stamp generated by the piloting detection unit 31 and the time stamp generated by the aerial vehicle behavior detection unit 11 are synchronized in clocking processing. From these time stamps, the correspondence between the piloting history and the aerial vehicle behavior history, that is, how the aerial vehicle 10 has behaved in response to the piloting by the operator can be identified. More specifically, if a time stamp included in the aerial vehicle behavior history exists in a period corresponding to immediately after the time stamp included in the piloting history, then it means that the aerial vehicle 10 has behaved as indicated by the aerial vehicle behavior history according to the piloting history.

In the imaging device 40, a baggage behavior detection unit 41 detects the behavior of baggage connected to the aerial vehicle 10, generates information indicating a detection result (referred to as the baggage behavior history), and transmits the generated information to the server device 20 through the network 2. The content of the baggage behavior history will be described later.

Figure 6:
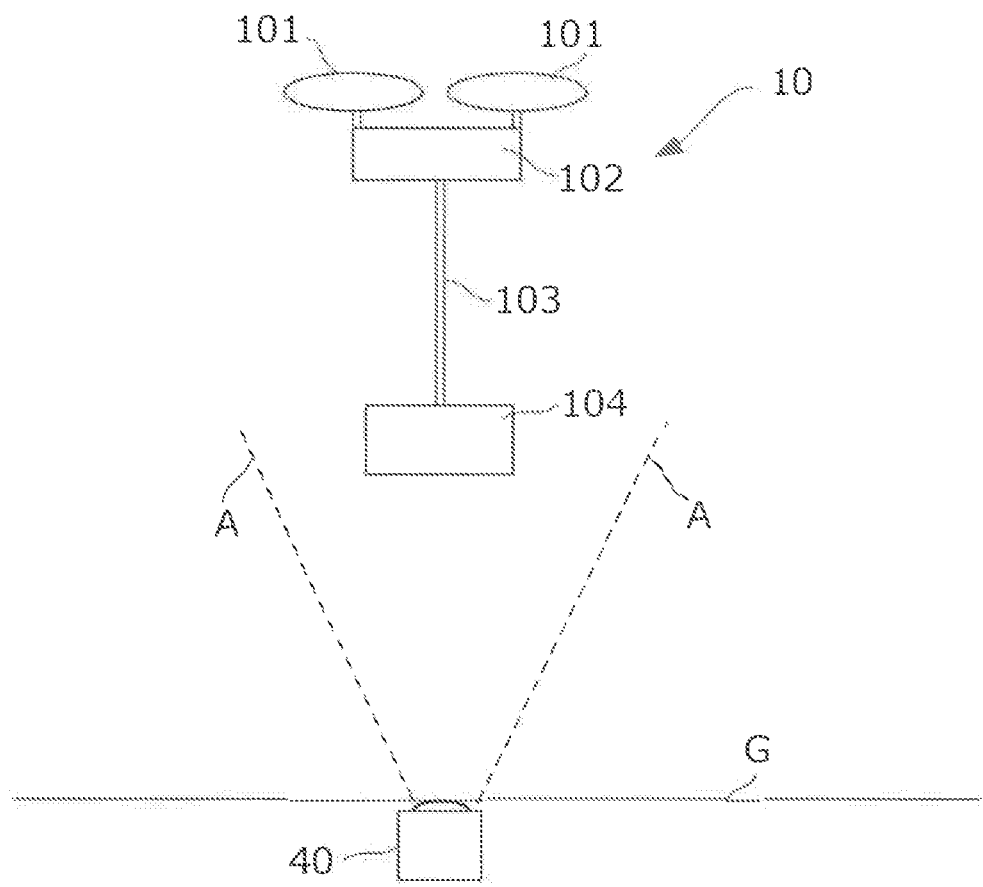
FIG. 6 is a schematic diagram illustrating in a simplified manner how the aerial vehicle with suspended baggage descends in accordance with the present invention.

Here, FIG. 6 is a schematic diagram illustrating, in a simplified manner, how the baggage is lowered from the aerial vehicle 10. In the aerial vehicle 10, a plurality of propellers 101 are provided in a main body 102 in which electronic components such as the foregoing processor 1001 are incorporated. Baggage 104 is connected to the bottom of the main body 102 by a connector 103. For the server device 20 to learn the piloting at the time of lowering the baggage, an operator performs piloting such that the connector is fed out downward to lower the baggage while holding the aerial vehicle 10 at a certain altitude in the state as illustrated in FIG. 6.

The baggage 104 may shake when, for example, subjected to wind or affected by the wobble of the aerial vehicle 10. Such shaking of the baggage 104 can be suppressed by changing the position or attitude of the aerial vehicle 10. The imaging device 40 is provided at a drop point of the baggage 104 to detect the behavior of the baggage. The imaging device 40 is installed by, for example, being embedded in a landing surface G of the aerial vehicle 10. Although not illustrated, the anemometer 50 is also provided in the vicinity of the drop point of the baggage 104.

The imaging range of the imaging device 40 is the range between two dashed lines A in the drawing. The imaging device 40 captures a moving image or a still image at predetermined time intervals, with the baggage 104 included in the imaging range. The imaging device 40 tracks the position of the baggage 104 in the captured images by image processing, and detects how the baggage 104 behaves over time. The behavior of the baggage 104 detected here is mainly a behavior in a horizontal direction.

The baggage behavior history generated by the imaging device 40 includes the time stamp indicating the date and time of imaging and the aerial vehicle identification information of the aerial vehicle 10, as well as the data indicating the behavior of the baggage 104 (the data on the behavior of the baggage 104 obtained by analyzing the data of moving image in this case). The time stamp generated by the piloting detection unit 31 and the time stamp generated by the baggage behavior detection unit 41 are synchronized in clocking processing. From these time stamps, the correspondence between the piloting history and the baggage behavior history, that is, how the baggage 104 has behaved in response to the piloting by the operator can be identified. More specifically, if a time stamp included in the baggage behavior history exists in a period corresponding to immediately after a time stamp included in the piloting history, then it means that the baggage 104 has behaved as indicated by the baggage behavior history according to the piloting history. In addition, the time stamp generated by the aerial vehicle behavior detection unit 32 and the time stamp generated by the baggage behavior detection unit 41 are also synchronized in clocking processing. From these stamps, the correspondence between the aerial vehicle behavior history and the baggage behavior history, that is, how the baggage 104 has behaved in response to the behavior of the aerial vehicle 10 can be identified. More specifically, if a time stamp included in the baggage behavior history exists in a period corresponding to immediately after a time stamp included in the aerial vehicle behavior history, then it means that the baggage 104 has behaved as indicated by the baggage behavior history according to the aerial vehicle behavior history.

For example, in the case where the baggage 104 is securely fixed to the aerial vehicle 10, the behavior of the aerial vehicle 10 and the behavior of the baggage 104 are substantially identical. On the other hand, in the present embodiment, the aerial vehicle 10 and the baggage 104 are connected by the connector 103, which is relatively flexible such as a rope, so that the behavior of the aerial vehicle 10 and the behavior of the baggage 104 are different. Therefore, in the present embodiment, the aerial vehicle behavior history and the baggage behavior history are separately detected.

Returning to the description in relation to FIG. 5, in the server device 20, a first acquisition unit 21 acquires, through the network 2, the piloting history and the aerial vehicle behavior history generated by the piloting detection unit 31 and the aerial vehicle behavior detection unit 11, respectively.

In the server device 20, a second acquisition unit 22 acquires, through the network 2, the baggage behavior history generated by the baggage behavior detection unit 41.

In the server device 20, a condition acquisition unit 23 acquires data that indicates the wind direction and/or wind speed (hereinafter referred to as the condition data) from the anemometer 50 through the network 2. The aerial vehicle identification information of the aerial vehicle 10 that is flying and time stamps are imparted also to the condition data, as with the piloting history, the aerial vehicle behavior history, and the baggage behavior history.

In the server device 20, a learning unit 24 performs machine learning on the relationship between the piloting of the aerial vehicle 10 and the behavior of baggage on the basis of the aerial vehicle behavior history and the piloting history acquired by the first acquisition unit 21 and the baggage behavior history acquired by the second acquisition unit 22, and the condition data acquired by the condition acquisition unit 23, and generates a learning model. This learning model makes it possible to identify the content of piloting best suited to the behavior of an arbitrary aerial vehicle 10, the behavior of baggage, and wind direction and air volume.

In the server device 20, a storage unit 25 stores the learning model generated by the learning unit 24. The learning model is used for performing, for example, the automatic piloting of the aerial vehicle 10 through the network 2.

Operation

A description will now be given of the operation of the server device 20. In the following description, when the server device 20 is described as the principal of processing, it specifically means that predetermined software (program) is read onto hardware, such as the processor 2001 and the memory 2002, so that the processor 2001 performs calculation, communication is performed by the communication device 2004, and the reading and/or writing of data in the memory 2002 and the storage 2003 is controlled, thereby executing the processing. The same applies to the aerial vehicle 10 and the piloting device 30.

Figure 7:
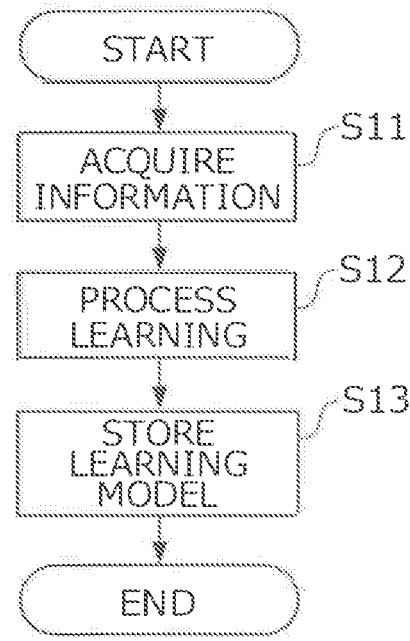
FIG. 7 is a flowchart illustrating an example of the operation of the server device in accordance with the present invention.

In FIG. 7, the first acquisition unit 21, the second acquisition unit 22, and the condition acquisition unit 23 of the server device 20 acquire information, respectively. (step S11). More specifically, the first acquisition unit 21 acquires, through the network 2, the piloting history generated by the piloting detection unit 31 of the piloting device 30 and the aerial vehicle behavior history generated by the aerial vehicle behavior detection unit 11 of the aerial vehicle 10. Further, the second acquisition unit 22 acquires, through the network 2, the baggage behavior history generated by the baggage behavior detection unit 41 of the imaging device 40. The condition acquisition unit 23 acquires, through the network 2, the condition data indicating the wind direction and/or the wind speed from the anemometer 50.

At this time, the first acquisition unit 21 does not have to acquire the piloting history generated by the piloting detection unit 31 and the aerial vehicle behavior history generated by the aerial vehicle behavior detection unit 11 at the same timing, and may acquire these histories at different timings. Further, the first acquisition unit 21 may or may not acquire the piloting history generated by the piloting detection unit 31 each time the piloting history is generated. Similarly, the first acquisition unit 21 may or may not acquire the aerial vehicle behavior history generated by the aerial vehicle behavior detection unit 11 each time the behavior history is generated. Further, the first acquisition unit 21 may acquire the piloting history generated by the piloting detection unit 31 and the aerial vehicle behavior history generated by the aerial vehicle behavior detection unit 11 by requesting such histories at any timing.

Further, the second acquisition unit 22 does not have to acquire the baggage behavior history at the same timing as the information acquisition by the first acquisition unit 21, and may acquire the baggage behavior history at a different timing. Further, the second acquisition unit 22 may or may not acquire the baggage behavior history generated by the baggage behavior detection unit 41 each time the baggage behavior history is generated. Further, the second acquisition unit 22 may acquire the baggage behavior history generated by the baggage behavior detection unit 41 by requesting such history at any timing. The same applies to the condition acquisition unit 23.

Then, the learning unit 24 of the server device 20 performs machine learning on the relationship between the piloting of the aerial vehicle 10 and the behavior of baggage on the basis of the aerial vehicle behavior history and the piloting history acquired by the first acquisition unit 21, the baggage behavior history acquired by the second acquisition unit 22, and the condition data acquired by the condition acquisition unit 23 (step S12).

First, the learning unit 24 selects, from among a plurality of acquired piloting histories, aerial vehicle behavior histories, baggage behavior histories, and condition data, the piloting history, the aerial vehicle behavior history, the baggage behavior history, and the condition data that include the same aerial vehicle identification information and time stamp groups that are close to each other, and then stores the selected histories and data as an information group related to one flight by one set of the piloting device 30 and the aerial vehicle 10. The time stamp groups that are close to each other refer to time stamp groups in which the time interval between a certain time stamp and a time stamp that is temporally closest is within a threshold value.

Then, the learning unit 24 performs machine learning that uses a regression analysis method, in which the baggage behavior history, the aerial vehicle behavior history, and the condition data are defined as explanatory variables, and the piloting history is defined as a target variable. By using the learning model generated by this machine learning, it is possible to identify a piloting content which controls the behavior of baggage to a predetermined range (e.g. the range of the amount of movement in the horizontal direction being within 5 cm) or a piloting content which brings the behavior of baggage back to the predetermined range without delay even if the behavior of the baggage deviates from the predetermined range in the case of a certain behavior of the aerial vehicle 10, a certain baggage behavior, and a certain wind direction and a certain air volume. The piloting contents here may include any piloting-related parameters such as piloting timings, types, amounts, and directions.

Then, a storage unit 25 of the server device 20 stores the learning model generated by the learning unit 24 (step S13).

According to the embodiment described above, the piloting that makes it possible to lower baggage connected to the aerial vehicle 10 in a stable state can be learned.

Modification Examples

The present invention is not limited to the embodiment described above. The foregoing embodiment may be modified as follows. Further, two or more of the following modification examples may be combined and implemented.

Modification Example 1

In the embodiment, in order to identify how the aerial vehicle 10 has behaved in response to the piloting by the operator, the temporal proximity relationship between the time stamp included in the piloting history and the time stamp included in the aerial vehicle behavior history has been referred to; however, the method for the identification is not limited to this example. For example, each time the piloting is performed in the piloting device 30, a piloting identifier for identifying the piloting operation is issued and included in the piloting history to be transmitted to the server device 20, while at the same time, the piloting identifier is included in a flight control instruction for the aerial vehicle 10 sent from the piloting device 30. The aerial vehicle 10 includes the piloting identifier and the aerial vehicle behavior history when the flight control is conducted according to the piloting identifier in the history of processing for its own flight control. Then, the aerial vehicle behavior detection unit 11 of the aerial vehicle 10 includes the piloting identifier in the aerial vehicle behavior history and transmits aerial vehicle behavior history to the server device 20. This enables the server device 20 to identify how the aerial vehicle 10 has behaved in response to the piloting by the operator.

Further, the behaviors of the baggage 104 detected in the embodiment were mainly the behaviors in the horizontal direction; however, the direction of the behaviors to be detected are not limited thereto. For example, an arrangement may be made to detect the behavior of the baggage 104 in any direction, such as a vertical direction.

Modification Example 2

In the embodiment, the learning unit 24 has performed the machine learning in which the baggage behavior history, the aerial vehicle behavior history, and the condition data are defined as the explanatory variables, and the piloting history is defined as the target variable; however, the machine learning is not limited thereto, and may be performed as described below.

The learning unit 24 may perform the machine learning in which the baggage behavior history is defined as an explanatory variable, and the piloting history is defined as a target variable. In other words, in the machine learning, the aerial vehicle behavior history and the condition data are not necessarily essential. In this case, the first acquisition unit 21 acquires the piloting history of the aerial vehicle 10 in the case where an object connected to the aerial vehicle 10 piloted by an operator is lowered onto the ground. The second acquisition unit 22 acquires the behavior history of the object in the case where the object is lowered onto the ground. The learning unit 24 performs the machine learning on the relationship between the piloting of the aerial vehicle 10 and the behavior of the object on the basis of the piloting history acquired by the first acquisition unit 21 and the behavior history of the object acquired by the second acquisition unit 22.

Further, the condition data used by the learning unit 24 is not limited to the wind direction and/or wind speed illustrated in the embodiment, and may include, for example, the stiffness of the connector, the length of the connector, the volume of the baggage, the weight of the baggage, the lowering speed of the baggage, or at least one of rainfall, snowfall, and the like at the time of lowering the baggage. In short, the learning unit 24 may perform the machine learning on the basis of at least one of a condition related to the connector (e.g. the stiffness of the connector or the length of the connector), a condition related to the object (the weight of baggage, the volume of the baggage, or the lowering speed of the baggage), or a condition related to the external environment at the time of lowering the object (the direction of wind, the air volume, rainfall, snowfall or the like at the time of lowering the baggage). This is because the condition data listed above also affects the relationship between the piloting and the baggage behavior. The conditions related to the connector, the conditions related to the object, or the conditions related to the external environment when the object is lowered may be input in advance to the server device 20 by an administrator, or may be measured by predetermined measurement devices and input to the server device 20. Conditions that can be identified before the flight, such as the stiffness of the connector, the length of the connector, the weight of the baggage, and the volume of the baggage may be input to the server device 20 by the administrator before, for example, the aerial vehicle 10 lowers. Further, if the lowering speed of the baggage can be identified as a flight schedule in advance, then the baggage lowering speed may be input to the server device 20 by the administrator before the descent of the aerial vehicle 10. Further, if the aerial vehicle 10 can measure the lowering speed, then the lowering speed may be input from the aerial vehicle 10 to the server device 20 through the network 2. In addition, measurement devices (including the anemometer 50 in the embodiment) which measure an external environment such as wind direction, air volume, rainfall, and snowfall at the time of lowering the baggage may be connected to the network 2, and the external environment information may be input from the measurement devices to the server device 20 through the network 2.

Modification Example 3

In the embodiment, the second acquisition unit 22 has acquired the baggage behavior histories from the images captured by the imaging device 40; however, the method for acquiring the baggage behavior histories is not limited thereto. The second acquisition unit 22 may alternatively acquire the baggage behavior histories from an output value of a sensor installed to an object or an output value of a sensor installed to the housing (e.g. a hollow box member which is to accommodate baggage and which is suspended from a connector) of an object. The sensors are, for example, acceleration sensors or gyro sensors adapted to detect the behavior of an object, and generate information indicating detection results (the baggage behavior histories) and transmit the information to the server device 20 through the network 2. The baggage behavior history includes a time stamp indicating the day and time of a behavior and the aerial vehicle identification information of the aerial vehicle 10, as well as sensing data that indicates baggage behaviors. The output values of the sensor installed to the housing of an object (i.e. the behaviors of the housing) can be handled as the information that roughly indicates the behaviors of the baggage accommodated in the housing.

Modification Example 4

The function of the server device 20 (information processing device) may be distributed and provided by a plurality of devices. Further, the aerial vehicle 10, the piloting device 30, the imaging device 40, and the anemometer 50 may replace at least a part of the function of the server device 20 (information processing device). Further, in the foregoing embodiment, the method for measuring the position of the aerial vehicle 10 is not limited to the method using the GPS. The position of the aerial vehicle 10 may be measured by a method not using the GPS.

OTHER MODIFICATION EXAMPLES

The block diagrams used in the description of the foregoing embodiment illustrate blocks in functional units. These functional blocks (components) are implemented by a random combination of at least one of hardware and software. Further, a method of implementing each functional block is not particularly limited. More specifically, each functional block may be implemented using one device physically or logically coupled, or directly or indirectly connecting (for example, wired or wireless) two or more devices that are physically or logically separated from each other, and may be implemented using the plurality of devices. The functional block may be implemented by combining software with one device or the plurality of devices mentioned above.

The functions include but are not limited to: judgment, decision, determination, computation, calculation, processing, derivation, investigation, search, confirmation, reception, transmission, output, access, resolution, selection, appointment, establishment, comparison, assumption, expectation, deeming, broadcasting, notifying, communicating, forwarding, configuring, reconfiguring, allocating, mapping, and assigning. For example, a functional block (configuration unit) that causes transmission to function is called a transmitting unit or a transmitter. In any case, as described above, the implementation method is not particularly limited.

For example, a server, a client, or the like in an embodiment of the present disclosure may function as a computer that performs the processing of the present disclosure.

Each mode/embodiment described in the present disclosure may be applied to at least one of LTE (Long Term Evolution), LTE-A (LTE-Advanced), SUPER 3G, IMT-Advanced, 4G (4th generation mobile communication system), 5G (5th generation mobile communication system), FRA (Future Radio Access), NR (new Radio), W-CDMA (registered trademark), GSM (registered trademark), CDMA2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), a system using other appropriate systems, and next generation systems extended based thereon. Further, a plurality of systems may be combined (for example, a combination of at least one of LTE and LTE-A with 5G) and applied.

The processing procedure, sequence, flowchart, and the like of each mode/embodiment described in the present disclosure may be reordered as long as there is no contradiction. For example, regarding the methods described in the present disclosure, elements of various steps are presented in an exemplary order, and are not limited to any specific order presented.

Input and output information and the like may be stored in a specific place (e.g. a memory) or may be managed using a management table. Information and the like that is input and output can be overwritten, updated, or added. Output information and the like may be deleted. Input information and the like may be transmitted to another device.

Determination may be made on the basis of a value represented by 1 bit (0 or 1), a Boolean value (Boolean: true or false), or the comparison of numerical values (e.g. the comparison with a predetermined value).

Each mode/embodiment described in the present disclosure may be used alone or in combination, or may be switched and used in the course of implementation. Further, the notification of predetermined information (e.g. the notification of "being X") is not limited to being explicitly performed, and may alternatively be performed implicitly (e.g. not performing the notification of the predetermined information).

Although the present disclosure has been described in detail above, it is obvious to those skilled in the art that the present disclosure is not limited to the embodiments described in the present disclosure. The present disclosure can be implemented as modified and changed modes without departing from the spirit and scope of the present disclosure defined by the description of the claims. Therefore, the description of the present disclosure is intended for illustrative purposes, and has no restrictive meaning for the present disclosure.

Software, regardless of whether it is called software, firmware, middleware, microcode, a hardware description language, or any other name, should be broadly interpreted to mean instructions, instruction sets, codes, code segments, program codes, programs, subprograms, software modules, applications, software applications, software packages, routines, subroutines, objects, executables, threads of execution, procedures, functions, and the like.

Further, software, instructions, information, and the like may be transmitted and received through a transmission medium. For example, if software is transmitted from a website, a server, or other remote source by using at least one of wired technology (a coaxial cable, a fiber optic cable, a twisted pair, a digital subscriber line (DSL), and the like) and wireless technology (infrared, microwave, and the like), then at least one of these wired and wireless technologies is included in the definition of a transmission medium.

The information, signals, and the like described in the present disclosure may be represented using any of a variety of different technologies. For example, data, instructions, commands, information, signals, bits, symbols, chips, and the like that can be referred to throughout the above description may be represented by voltages, currents, electromagnetic waves, magnetic fields or magnetic particles, optical fields or photons, or any combination of these.

The terms described in the present disclosure and the terms necessary for understanding the present disclosure may be replaced with terms having the same or similar meanings.

Further, the information, the parameters, and the like described in the present disclosure may be represented using absolute values, may be represented using relative values from predetermined values, or may be represented using another corresponding information. For example, radio resources may be indicated by indices.

The phrase "on the basis of" used in the present disclosure does not mean "only on the basis of" unless otherwise specified. In other words, the phrase "on the basis of" means both "only on the basis of" and "at least on the basis of."

Any reference to elements using designations such as "first" or "second" used in the present disclosure does not generally limit the quantity or the order of the elements. These designations may be used in the present disclosure as a convenient way to distinguish between two or more elements. Thus, references to first and second elements do not mean that only two elements may be adopted, or that the first element must precede the second element in some way.

In the present disclosure, in the case where the terms "include", "including" and variations thereof are used, these terms are intended to be as inclusive as the term "comprising." Further, the term "or" used in the present disclosure is intended not to be an exclusive OR.

In the present disclosure, in the case where articles are added in translation, such as a, an, and the in English, the present disclosure may include a case where nouns following these articles are plural.

In the present disclosure, the term "A and B are different" may mean "A and B are different from each other." The term may also mean that "each of A and B is different from C." Terms such as "separate," "coupled," and the like may be interpreted as with "different".

DESCRIPTION OF REFERENCE NUMERALS

1: flight system
10: aerial vehicle
11: aerial vehicle behavior detection unit
101: propeller
102: main body
103: connector
104: baggage
1001: processor
1002: memory
1003: storage
1004: communication device
1005: input device
1006: output device
1007: flying device
1008: sensor
1009: positioning device
20: server device
21: first acquisition unit
22: second acquisition unit
23: condition acquisition unit
24: learning unit
25: storage unit
2001: processor
2002: memory
2003: storage
2004: communication device
2005: input device
2006: output device
30: piloting device
31: piloting detection unit
3001: processor
3002: memory
3003: storage
3004: communication device
3005: input device
3006: output device
40: imaging device
41: baggage behavior detection unit
50: anemometer.

What is claimed is:

1. An information processing apparatus comprising:
a processor configured to:
acquire a piloting history of an aerial vehicle in a case where an object connected to the aerial vehicle piloted by an operator is lowered to a target point;
acquire a behavior history of the object in the case where the object is lowered to the target point; and
learn a relationship between a piloting of the aerial vehicle and a behavior of the object based on the piloting history acquired by the processor and the behavior history of the object acquired by the processor; and
control the piloting of the aerial vehicle based on the learned relationship between the piloting of the aerial vehicle and the behavior of the object.

2. The information processing apparatus according to claim 1, wherein the processor is configured to learn based on a behavior history of the aerial vehicle in addition to the piloting history and the behavior history of the object.

3. The information processing apparatus according to claim 1, wherein the processor is configured to learn based on at least one of a condition related to a connector used to connect the aerial vehicle and the object, a condition related to the object, or a condition related to an external environment at the time of lowering the object, in addition to the piloting history and the behavior history of the object.

4. The information processing apparatus according to claim 3, wherein the condition includes at least one of the stiffness of the connector, the length of the connector, the weight of the object, the volume of the object, the lowering speed of the object, and the wind direction, the air volume, rainfall, or snowfall at the time of lowering the object.

5. The information processing apparatus according to claim 1, wherein the processor is configured to acquire the behavior history of the object from an image of the object captured by an imaging device.

6. The information processing apparatus according to claim 1, wherein the processor is configured to acquire the behavior history of the object from an output value of a sensor installed to the object or to a housing unit of the object.

* * * * *